(12) United States Patent
Villarrubia

(10) Patent No.: US 10,676,254 B2
(45) Date of Patent: Jun. 9, 2020

(54) LID HAVING AN INBUILT SPOUT FOR DRINKING

(71) Applicant: Kel P Villarrubia, New Orleans, LA (US)

(72) Inventor: Kel P Villarrubia, New Orleans, LA (US)

(*) Notice: Subject to any disclaimer, the term of this patent is extended or adjusted under 35 U.S.C. 154(b) by 0 days.

(21) Appl. No.: 16/523,560

(22) Filed: Jul. 26, 2019

(65) Prior Publication Data

US 2019/0367223 A1   Dec. 5, 2019

Related U.S. Application Data

(60) Provisional application No. 62/703,639, filed on Jul. 26, 2018.

(51) Int. Cl.
*B65D 47/06* (2006.01)
*B65D 43/02* (2006.01)
*A47G 21/18* (2006.01)

(52) U.S. Cl.
CPC ......... *B65D 47/06* (2013.01); *B65D 43/0204* (2013.01); *A47G 21/18* (2013.01); *B65D 2203/02* (2013.01); *B65D 2251/06* (2013.01)

(58) Field of Classification Search
CPC ........... B65D 2543/00009; B65D 2543/00046; B65D 43/0204; A47G 21/18; A47G 19/2266; A47G 19/2272

USPC .................................................. 220/713, 717
See application file for complete search history.

(56) References Cited

U.S. PATENT DOCUMENTS

| | | | | |
|---|---|---|---|---|
| 4,756,440 A | * | 7/1988 | Gartner | B65D 43/0218 220/254.1 |
| 5,366,109 A | * | 11/1994 | Proshan | B65D 47/06 220/380 |
| 2006/0060589 A1 | * | 3/2006 | Lee | A47J 31/02 220/709 |
| 2007/0095846 A1 | * | 5/2007 | Goecke | B65D 43/0212 220/780 |
| 2008/0149651 A1 | * | 6/2008 | Samson | A47G 19/2272 220/717 |
| 2011/0290817 A1 | * | 12/2011 | Weiss | B65D 21/0222 220/780 |

* cited by examiner

*Primary Examiner* — King M Chu
(74) *Attorney, Agent, or Firm* — Barry Choobin; Patent 360

(57) ABSTRACT

The present invention is directed to a lid for disposable or reusable plastic, paper, Styrofoam, bioplastic, recycled plastic cups. The lid comprises a body and a lip extending downwards along the perimeter of the body. The body and lip sealably crimp over the cup. A conical shaped spout continuous with the body of the lid protrudes upwards. The spout is specifically shaped and sized for allowing drinking from the cup with or without the use of a straw.

8 Claims, 5 Drawing Sheets

LID HAVING AN INBUILT SPOUT FOR DRINKING

FIELD OF INVENTION

The present invention relates to a disposable or re-usable lid for plastic/paper cups, and more particularly relates to lids having an inbuilt spout for drinking with or without the use of a straw.

BACKGROUND

Marine and land plastic waste litter have become a major global environmental issue because of its severe detrimental impact on the environment and wildlife. According to one study, approximate 13 million tons of plastic leaks into the ocean every year. This plastic pollution in the ocean causes huge deaths of marine animals. Plastic straws are one of the major pollutants. According to a 2018 Ocean Conservancy Report of the 10 common types of trash found on beaches globally, the plastic straws were number 7 in the list. Approximately, 8.5 billion straws are discarded annually. In the United States of America alone, 500 million plastic straws are discarded every day.

To protect the environment and wildlife from plastic pollution, many types of plastic items are being banned in different countries. To date, the United Nations, European Union, several countries (ex; United Kingdom), U.S. states (ex: California) and cities (ex. Seattle) have or plan to ban plastic straws. Undoubtedly, the trend will continue to grow. Consumers of all ages have joined the movement by doing their part by turning down plastic straws and finding solutions to practice more sustainable behavior.

Moreover, the present invention's the integrated spout design reduces the pieces of cup lid packaging from three (lid/straw/straw wrapping) to one (lid) thereby eliminating two common components of packaging waste and potential litter.

Thus, in order to reduce single-use plastic waste and litter from degrading the environment and harming wildlife, a need is appreciated to find alternatives to straw use.

SUMMARY OF THE INVENTION

The principal objective of the present invention is therefore directed to a lid for plastic, paper, bioplastic, recycled plastic or other thermoform made cups, the lid having a spout for drinking.

An additional objective of the present invention is that the spout is specially designed to accommodate a straw.

A further objective of the present invention is that the lid can be made of recyclable plastic, bioplastic, recycled plastic, compostable or biodegradable material.

Still a further objective of the present invention is that the lid is provided in different shapes and sizes to fit a to fit a wide variety of single-use or reusable cup.

Yet another objective of the present invention is that the lid is economical to manufacture and is supply-chain friendly in terms of stacking, packaging, storing, displaying and transporting.

BRIEF DESCRIPTION OF THE DRAWINGS

The accompanying figures, which are incorporated herein, form part of the specification and illustrate embodiments of the present invention. Together with the description, the figures further serve to explain the principles of the present invention and to enable a person skilled in the relevant arts to make and use the invention.

DETAILED DESCRIPTION

The present invention is directed to a lid for plastic, paper, Styrofoam, bioplastic, recycled plastic cups, the lid having an upward protruding spout for drinking with or without the use of a straw.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
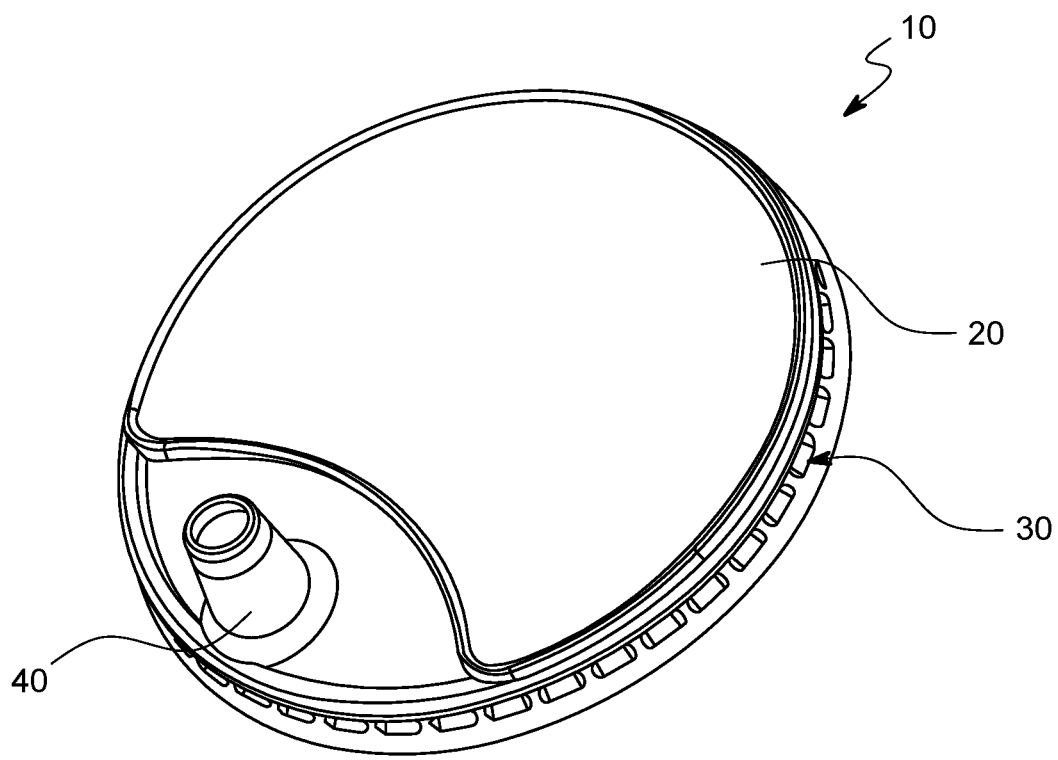
FIG. 1 shows the top side of the lid having an integrated protruding spout for drinking with or without use of a straw, according to an embodiment of the present invention.

Now referring to FIG. 1, which shows the lid 10 in accordance with an embodiment of the present invention.

Figure 2:
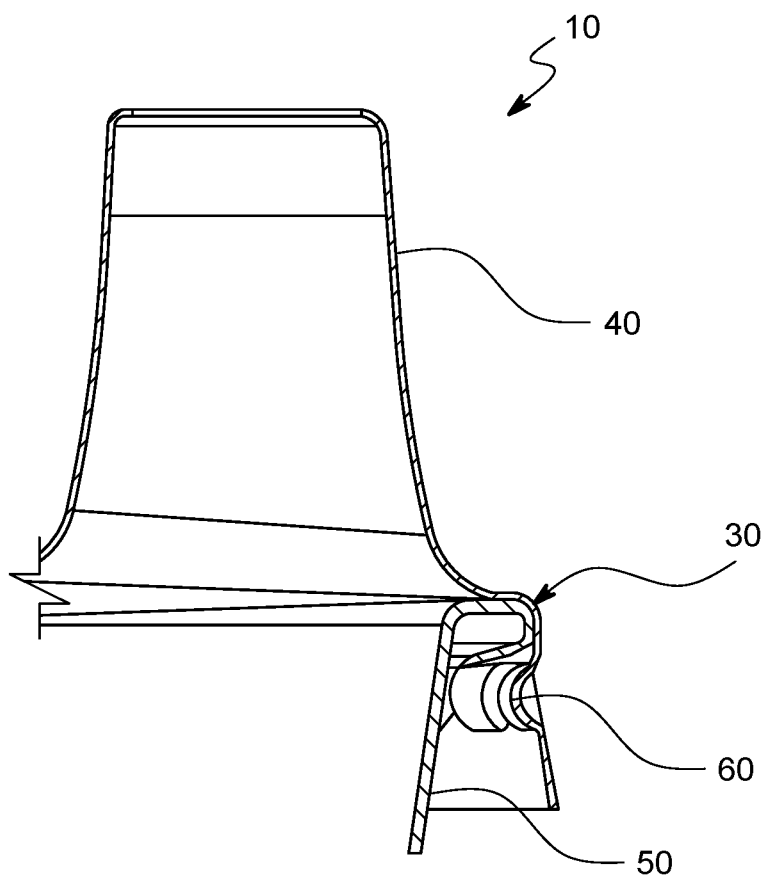
FIG. 2 shows the crimping mechanism of the lid, in accordance with an embodiment of the present invention.

The lid 10 shown in FIG. 1 is a circular disk-shaped body 20 of shape and size to cover a disposable plastic/paper cup. A lip 30 continuous with the body 20 and extends downwards along the perimeter (edge) of the body 20. The lip 30 is shaped and sized to snugly fit over the plastic, paper, Styrofoam, bioplastic, recycled plastic cups. The lip 30 can be crimped around the perimeter of the open top of the cup to provide a seal against any fluid leakage. The crimping mechanism of the lip 30 over the perimeter of the cup can be seen in FIG. 2. FIG. 2 is a cross-sectional view of the lid 10 crimped over a cup 50. The top edge of the cup 50 curves outwards to form a rounded or semi-rounded perimeter. The lip 30 comprises a rim 60 which can be pressed along the perimeter of the cup 50 to crimp the lid 10 over the cup 50. As shown in FIG. 2, the lid 10 is placed over the cup 50 and lip 30 is pressed along the perimeter of the cup, wherein the rim 60 forming a valley shape curves inwards due to the pressure and crimps the lid 10 over the cup 50. Thus, the lid 10 is configured to be sealably secured to plastic, paper, Styrofoam, bioplastic, recycled plastic cups.

Figure 3:
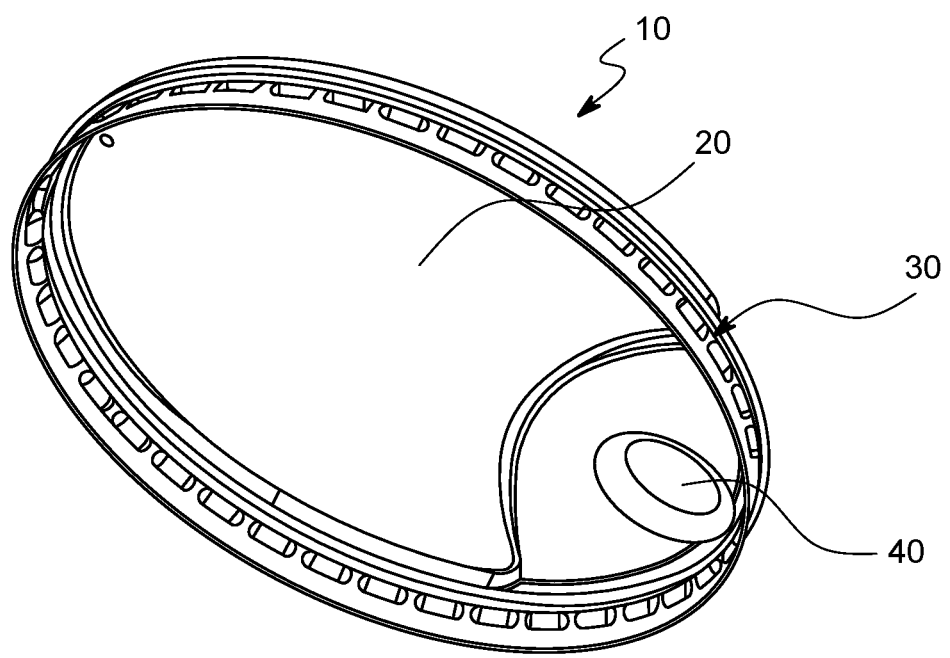
FIG. 3 is the bottom side of lid of FIG. 1 showing the bottom of the continuous spout, in according to an embodiment of the present invention.

Further shown in FIG. 1 is a spout 40 extending upwards from the body 20 of the lid 10. The spout 40 is continuous from the body 20 as shown in FIG. 3. The spout 40 and the lid 10 can be molded as a single piece by thermoforming molding process. The spout 40 shown in the figures is conical in shape having a height, a top diameter, and a bottom diameter. The top diameter is less than the bottom diameter to form the conical shaped spout 40. In other words, the protruding conical-shaped spout 40 has tapered walls with a diameter decreasing from bottom to top. The shape and size of the spout 40 ergonomically conform to the user's lips. The spout configured for drinking is hollow and is part of the molded, seamless cup lid 10.

In one case, the cups can be made of plastic, paper, Styrofoam, bioplastic, recycled plastic, and are preferably disposable in nature, but can also be made to be reused. The lids according to the present invention are preferably made of plastic, bioplastic or recycled plastic material. The plastic material used in making the lids can be recyclable. Examples of materials that can be used to manufacture the lid include PET (recyclable), rPET (recycled content and recyclable), PP (difficult to recycle), PS (difficult to recycle), PLA (compostable) and PHA. Preferably PET or rPET is used because it is recyclable in nature. Depending on the type of plastic used in the manufacture of the lids, the lids can be made either transparent, translucent or opaque. The lid can be manufactured in different shapes and sizes in order to fit a variety of cups commercially available. The lid can be made as single and seamless piece using thermoformed plastic using vacuum molding. Furthermore, the spout can be made in a variety of shapes, such as round, oval, rectangular and inverted wine glass.

The spout can be positioned anywhere on the body of the lid, for example near the edge or near the center of the lid. Preferably, the spout is provided near the edge of the lid, which makes the drinking through the spout easy. In one case, the height of the spout ranges from 0.5-1.0 inches and the top diameter of the spout is no larger than ⅜th inches. Such a configuration of the spout replicates the experience of drinking from a large size straw.

Figure 4:
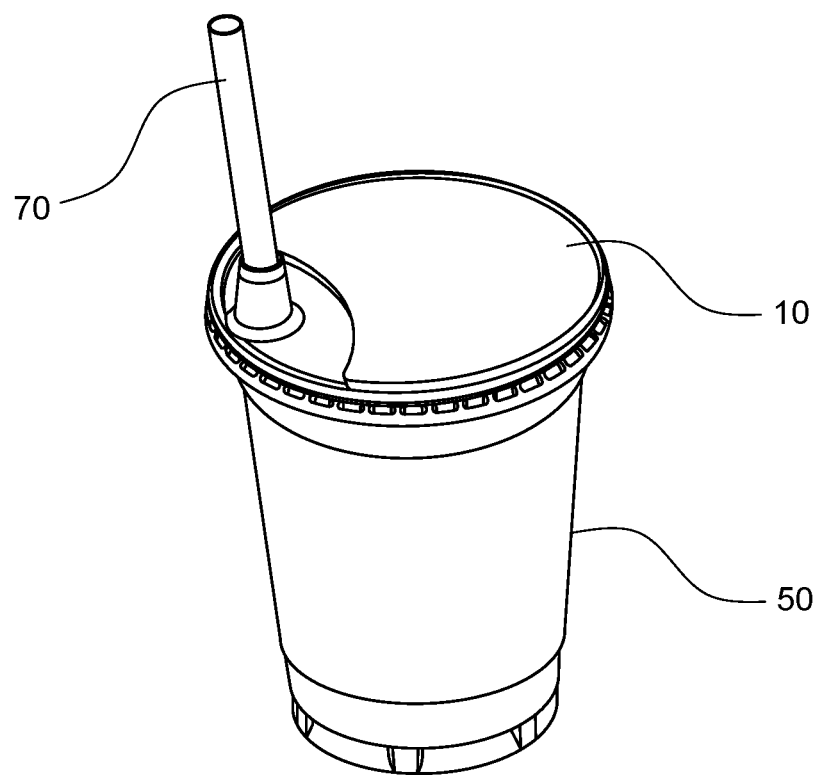
FIG. 4 shows the lid of FIG. 1 placed on a cup, and the lid having the straw, in accordance to an embodiment of the present invention.

In an exemplary embodiment, the top and bottom diameters of the spout are large enough to accommodate a straw. FIG. 4 shows an embodiment of the lid 10 covered on the cup 50 and a straw 70 is inserted through the spout 40. Thus, in case, a user wishes to use a straw for drinking does not have to remove or replace the lid of the present invention.

Figure 5:
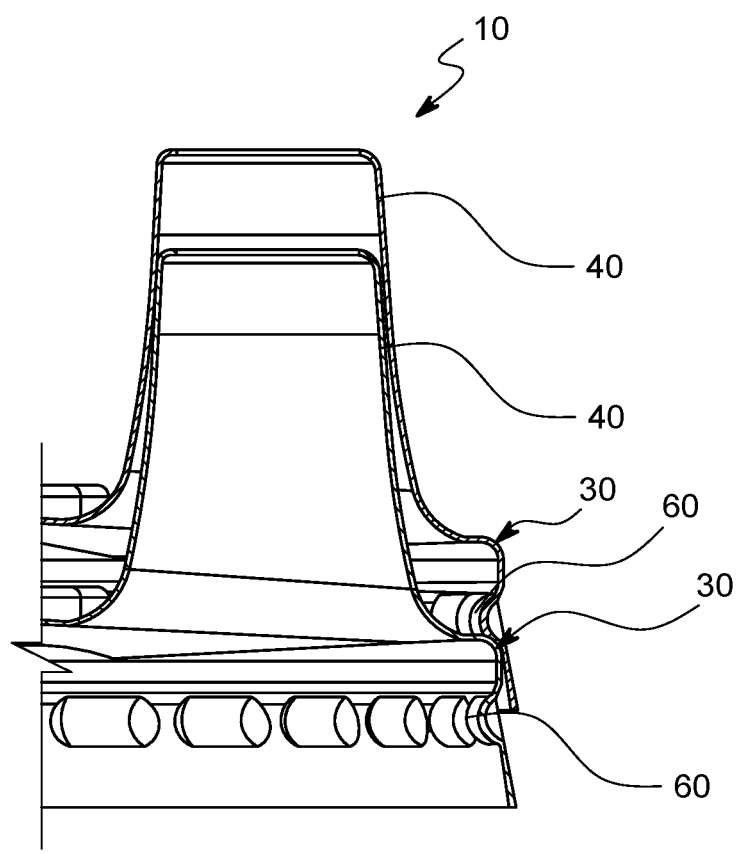
FIG. 5 shows a cross-section of stack of lids, in accordance with an embodiment of the present invention to facilitate supply-chain efficiencies, such as transporting, storing, and displaying.

FIG. 5 shows a cross-sectional view of a stack of two lids. The lids 10 are like the lid of FIG. 1. The sprout 40 is conical in shape which allows multiple lids to be stacked easily wherein the spout 40 of below lid partially inserts into the spout of above lid. Stacking the lids in such as way allows easy handling and transportation of multiple lids.

The present invention is advantageous that the lid is designed to minimize any spillage while on the go while drinking with or without the use of a straw. Moreover, the lid could be designed for single as well as multiple use. For example, multiple use lids can be used with a stadium cup. The makes the invention economical as well reduces the waste. In case a user still wishes to use a straw, the invention is superior because the design of integrated protruding spout securely holds the straw while the user is moving. This reduces any chance of spillage of the liquid contained in the cup.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A lid for a disposable or reusable plastic/paper cup, the lid comprising:
   a body;
   a lip formed with a downwardly extending rim from the outer edges of the body, the rim forming a valley shape curve over the perimeter of the cup to seal against any leakage when the cup is tilted; and
   a spout integrated with the body and protruding upwards, the spout positioned along the outer edges of the body and configured to be received in a mouth for drinking by tilting the cup and liquid contained in the cup flows out under gravity, thereby allowing tilting the cup to 180 degrees, the spout specifically configured to receive a straw, the spout is truncated conical in shape having the top diameter less than the bottom diameter permitting stacking of the lid over another lid.

2. The lid of claim 1, wherein the lid is made of recyclable,. compostable, and biodegradable plastic material.

3. The lid of claim 1, wherein the lid is made of PET or rPET.

4. The lid of claim 1, wherein the height of the spout ranges from 0.5 to 1.0 inches.

5. The lid of claim 1, wherein the lip is configured to crimp over the cup under applied pressure over the lip.

6. The lid of claim 1, wherein the spout and the lid are made as a single piece by thermoform molding process.

7. The lid of claim 1, wherein the top of the lid provides a large platform to communicate a consumer message and/or a company logo or branding.

8. The lid of claim 1, wherein the lid is made of biodegradable, compostable or recyclable paper.

* * * * *